UNITED STATES PATENT OFFICE 2,454,949

4-DIALKYLAMINOALKYLAMINO-6-METHOXYQUINOLINE

Horace A. Shonle and Arthur M. Van Arendonk, Indianapolis, Ind., assignors to Eli Lilly and Company, Indianapolis, Ind., a corporation of Indiana No Drawing. Application April 1, 1944, Serial No. 529,186

1 Claim. (Cl. 260—288)

This invention relates to certain new 6-substituted-4-[1'-methyl-4' - (dialkylamino) butylamino]quinolines, and their salts, which are effective as antimalarials; and to the process of making those new antimalarials.

The new antimalarials have the following general formula:

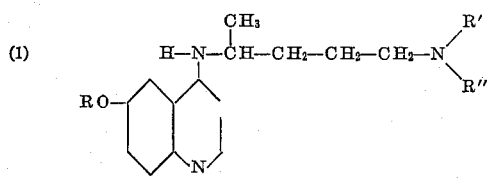

in which R represents an alkyl radical having not more than two carbon atoms, R' represents a non-tertiary (primary or secondary) alkyl radical having from 1 to 6 carbon atoms, and R" represents a non-tertiary alkyl radical having from 3 to 6 carbon atoms.

In preparing these new antimalarials, we start with a 1-methyl-4-(dialkylamino) butylamine of the following formula:

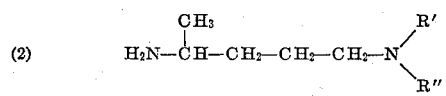

in which R' and R" have the same meaning as in Formula 1.

These diamines of Formula 2 are new, and are the invention of one of us, Shonle, and Joseph W. Corse, who describe and claim such new diamines in a co-pending application. They may be prepared as follows:

A mixture of 1-methyl-4-(dialkylamino)butanone and hydroxyl ammonium chloride in water solution is heated on a steam bath for 4 to 5 hours, and an excess of solid potassium bicarbonate is then added. The reaction mixture is then extracted with ether, and the reaction product is recovered by vacuum distillation of the ether solution. It is 1-methyl-4-(dialkylamino)butanoneoxime. A solution of this oxime in alcohol is then reduced with hydrogen in the presence of Raney nickel catalyst, at a temperature of from 90 to 100° C. and at an initial hydrogen pressure of 1150 p. s. i. This produces the desired 1-methyl-4-(dialkylamino) butylamine, which is recovered by separating the reaction mixture from the catalyst, and distilling such mixture under vacuum.

Our general method of preparing our new antimalarials of Formula 1 is as follows:

1. A mixture of 6 - methoxy- or 6 - ethoxy-4-chloroquinoline, a 1-methyl-4-(dialkylamino) butylamine in slight excess, and a suitable solvent such as p-cymene, is heated for several hours. The reaction mixture is cooled, and made acid, as with dilute hydrochloric acid. Desirably, the solvent is then diluted, as with ether. The resulting mixture is thoroughly shaken, and then allowed to stand in a separatory flask; where an aqueous layer separates out to the bottom. This aqueous layer is removed and made strongly basic as with sodium hydroxide solution. This liberates as a free base the desired substituted quinoline of Formula 1, in the form of an oil.

2. The resulting mixture of oil in aqueous medium is shaken with ether, and allowed to separate in a separatory flask. A lower aqueous layer is formed, which is removed and discarded. The upper layer is washed with water, and then dried. The ether is then removed from the solution, as on a steam bath, to leave an oily residue. This is distilled under vacuum, preferably at about 1 mm. pressure, and the fraction boiling at about 200–220° C. at that pressure is collected. It is a colorless oil, and is a purified form of the desired substituted quinoline of Formula 1.

3. This colorless oil may be converted to a crystalline form of the free base, by dissolving the oil in a suitable solvent, such as ether alone or mixed with petroleum ether, and cooling the solution to about 0° C.

4. The substituted quinoline may be converted to its dihydrochloride by dissolving it in anhydrous ether, and treating the ether solution with dry hydrogen chloride gas. This forms a hygroscopic gummy material, which is separated from the ether and dried in a vacuum desiccator over phosphorus pentoxide.

The following are examples of our invention:

*Example 1.*—6-methoxy-4-[1'-methyl-4'-(isopropylisobutylamino) butylamino]quinoline, and its dihydrochloride.

A mixture of 10 g. of 6-methoxy-4-chloroquinoline, 10 g. of 1-methyl-4-(isopropylisobutylamino) butylamine, and 50 cc. of p-cymene is heated on an oil bath for 8 to 10 hours. The reaction mixture is cooled, and 100 cc. of 5% hydrochloric acid is added to it. Then, 50 cc. of ether is desirably added, to dilute the p-cymene. The resulting mixture is thoroughly shaken, and then permitted to stand in a separatory flask. An aqueous layer separates out to the bottom. This aqueous layer is removed, and made strongly basic with a sodium hydroxide solution. This liberates an oily material, which consists essentially of the free base 6-methoxy-4-[1'-methyl- 4'-(isopropylisobutylamino)butylamino]quinoline, which has the following formula:

(3) 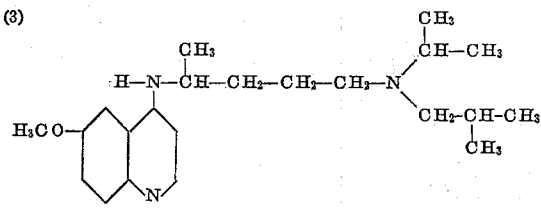

This product, together with the aqueous medium in which it was formed, is mixed and shaken with 150 cc. of ether, and then allowed to separate in a separatory flask. A lower aqueous layer is formed, which is removed and discarded. The remaining ether layer is washed one or more times with 150 cc. portions of water, and is then dried, as with anhydrous magnesium sulfate. The drying agent is removed, as by filtration, and the ether solution is then heated on a steam bath, to evaporate the ether. This leaves an oily residue, which is then distilled under vacuum. The fraction boiling at about 200-220° C. at 1 mm. pressure is collected. It is a colorless oil, and is a purified form of the 6-methoxy-4-[1'-methyl-4'-(isopropylisobutylamino)butylamino]quinoline of Formula 3.

This colorless oil is then dissolved in ether, or in an ether and petroleum ether mixture, and the solution is cooled to about 0° C. A crystalline precipitate forms, which is recovered by filtration. It is a crystalline form of the substituted quinoline of Formula 3.

The substituted quinoline of Formula 3 may be converted to its dihydrochloride. To this end, it is dissolved in anhydrous ether, and dry hydrogen chloride gas is passed through the resulting solution. A gummy material is formed, which is separated from the ether and dried in a vacuum desiccator over phosphorus pentoxide. This is the dihydrochloride of 6-methoxy-4-[1'-methyl-4'-(isopropylisobutylamino)butylaminoquinol-ine, which melts at 157-160° C. It has the empirical formula $C_{22}H_{37}N_3OCl_2$, and theoretically has 9.8% nitrogen. Analysis of our product shows 10.0% nitrogen.

*Example 2.*—6-methoxy-4-[1'-methyl-4'-(methyl-n-butylamino)butylamino]quinoline, and its dihydrochloride.

Example 1 is repeated, save that instead of using 1-methyl-4-(isopropylisobutylamino)butyl-amine, we use 1-methyl-4-(methyl-n-butylamino)butylamine, and prepare the following compounds:

a. 6-methoxy-4-[1'-methyl-4'-(methyl-n-butylamino)butylamino]quinoline, which has the following formula:

(4) 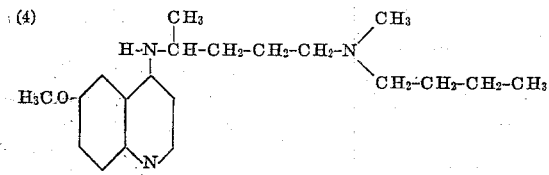

b. The dihydrochloride of this substituted quinoline of Formula 4. This dihydrochloride has the empirical formula $C_{20}H_{33}N_3OCl_2$, and theoretically has 10.4% nitrogen. Analysis of our product shows 10.3% nitrogen.

*Example 3.*—6-methoxy-4-[1'-methyl-4'-(di-isobutylamino)butylamino]quinoline, and its dihydrochloride.

Example 1 is repeated, save that instead of using 1-methyl-4-(isopropylisobutylamino)butyl-amine, we use 1-methyl-4-(di-isobutylamino)-butylamine, and produce the following compounds:

a. 6-methoxy-4-[1'-methyl-4'-(di-isobutylamino)butylamino]quinoline, which has the following formula:

(5) 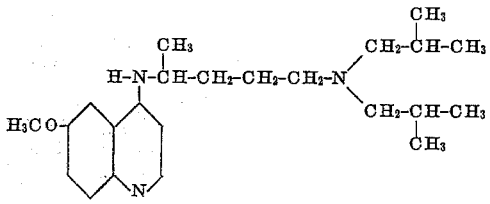

b. The dihydrochloride of this substituted quinoline of Formula 5. This dihydrochloride has the empirical formula $C_{23}H_{39}N_3OCl_2$, and theoretically has 9.5% nitrogen. Analysis of our product shows 9.5% nitrogen.

*Example 4.*—6-methoxy-4-[1'-methyl-4'-(methyl-isopropyl)butylamino]quinoline, and its dihydrochloride.

Example 1 is repeated, save that instead of using 1-methyl-4-(isopropylisobutylamino)butyl-amine, we use 1-methyl-4-(methyl-isopropylamino)butylamine, and prepare the following compounds:

a. 6-methoxy-4-[1'-methyl-4'-(methyl-isopropyl)butylamino]quinoline, which has the following formula:

(6) 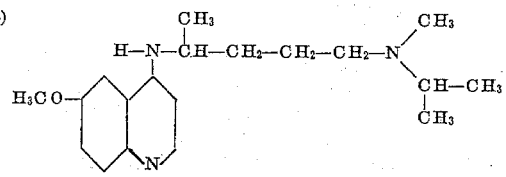

b. The dihydrochloride of this substituted quinoline of Formula 6.

*Example 5.*—Any of the preceding examples may be repeated, save that instead of the 1-methyl-4-(dialkylamino)butylamines used in those examples, we may use other 1-methyl-4-(dialkylamino)butylamines of Formula 2, in which the R' and R'' substituents are other than those of the preceding examples, including those in which R' may represent ethyl, n-propyl, n-butyl, n-pentyl or one of its isomers, or n-hexyl or one of its isomers; and R'' may represent n-pentyl or n-hexyl, or an isomer thereof.

*Example 6.*—6-Ethoxy-4-[1'-methyl-4'-(dialkylamino)butylamino]quinolines, and their dihydrochlorides.

Any of the preceding examples may be repeated, save that instead of using 6-methoxy-4-chloroquinoline, we may use 6-ethoxy-4-chloro-quinoline, to produce the corresponding 6-ethoxy-4-[1'-methyl-4'-(dialkylamino)butylamino]quinolines, and their dihydrochlorides.

*Example 7.*—Any of the preceding examples may be repeated, save that instead of forming the dihydrochlorides of the substituted quinolines obtained we may form the dihydrobromides thereof, or may form other di-salts thereof, such for instance as the sulfates, nitrates, the phosphates, the lactates, the propionates, etc.

Compounds of the type shown in Formula 1 above and produced by the procedures of the various examples given above, exhibit antimalarial activity against *Plasmodium lophurae* in ducklings when administered orally. This is a recognized "screening" test for antimalarial activity; and indicates that these compounds are of value as antimalarials.

We claim as our invention:

The new antimalarial comprising the compound having the following general formula

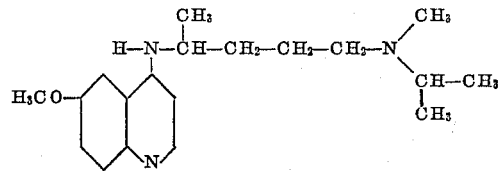

and its salts.

HORACE A. SHONLE.
ARTHUR M. VAN ARENDONK.

REFERENCES CITED

The following references are of record in the file of this patent:

UNITED STATES PATENTS

| Number | Name | Date |
|---|---|---|
| 1,747,531 | Schulemann | Feb. 18, 1930 |

OTHER REFERENCES

Schonhofer, Zeitschrift fur Physiol. Chemie, vol. 274, pp. 1-8 (1942).

Williams, "Chemotherapy of Malaria" (published by Lederle Labs., New York, 1941), page 141.

Chemical Abstracts, vol. 37, p. 5064 (1943).

Fourneau, Annales de L'Institut Pasteur, vol. 46, p. 538 (1931).

Helv. Chim. Acta, vol. 26, p. 1174 (1943).